3,465,005
TETRACYCLINE SALTS OF 4-METHYL-
AESCULETIN-MONOETHANOIC ACID
Pierre-André Raymond Delaby, Neuilly-sur-Seine, France, assignor to Les Laboratoires Dausse, Paris, France, a French body corporate
No Drawing. Filed Nov. 2, 1967, Ser. No. 680,034
Claims priority, application France, Nov. 7, 1966, 82,727; June 23, 1967, 111,642
Int. Cl. C07d 21/00; C07c 103/19; A61k 21/00
U.S. Cl. 260—343.2                                5 Claims

ABSTRACT OF THE DISCLOSURE

Salts of tetracycline with 4-methyl-aesculetin-monoethanoic acid have a wider antibacterial spectrum than the parent antibiotic.

---

This invention relates to tetracycline derivatives and their preparation.

The present invention provides salts of tetracyclines with 4 - methyl - aesculetin - monoethanoic acid (or 4-methyl - 6,7 - dihydroxycoumarinyl - 7 - monoethanoic acid), and, more especially, the salt of the formula:

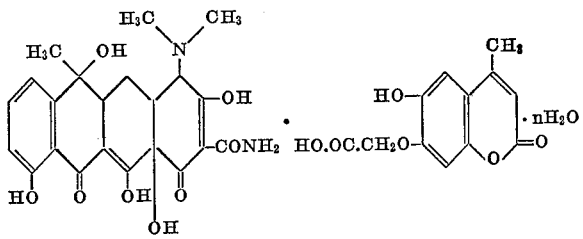

where $n$ is 2 or 3.

In accordance with the invention, these salts may be prepared by contacting the acid with the tetracycline in an inert organic diluent, more particularly a lower alkanol, such as methanol, ethanol, propanol, isopropanol or n-butanol, or in ethyl acetate, or dimethylformamide. The proportion of water in the reaction mixture is preferably not more than that required to form the desired hydrate.

The reaction can also be effected in aqueous, alcoholic or aqueous alcoholic medium by double decomposition between a strong acid salt of the base and a salt of the acid, for example tetracycline hydrochloride and sodium 4-methyl-aesculetin-monoethanoate.

Depending upon the mode of recrystallisation, the salt may be obtained with 1 to 6, generally 2 or 3, molecules of water of crystallisation.

The following examples illustrate the invention.

Example I

To 1000 g. of tetracycline in solution in 4.5 litres of dimethylformamide heated at 60° C. on the water bath are added with stirring 550 g. of 4-methyl-aesculetin-monoethanoic acid. The solution is filtered and 11.5 litres of demineralised water are then added. After 24 hours in the refrigerator, the crystals formed are separated. These crystals are washed with water and dried in a drying chamber in vacuo at 40° C. 1.032 kg. of tetracycline salt, i.e. a yield of 66.5%, is obtained.

The product takes the form of microscopic pale-yellow crystals which are very sparingly soluble in water but soluble in hydrophilic organic solvents, more particularly the alcohols and dimethylformamide.

Analysis.—Calculated for dihydrate: C, 55.84%; H, 5,20%; N, 3.83%; O, 35.03%; H₂O, 4.92%. Found: C, 56.26%; H, 5.13%; N, 3.48%; O, 34.96%; H₂O, 5.1%.

The dihydrate melts at 167–168° C. (eap.) with decomposition.

Example II

Oxytetracycline (24.8 g., 0.05 mole) is added to a solution of 4-methyl-aesculetin-monoethanoic acid (12.5 g., 0.05 mole) in dimethylformamide (70 ml.) at 60° C. Demineralised water (70 ml.) is added to the brown liquid obtained, and the mixture is stirred until crystallisation begins, and then kept in a refrigerator for 12 hours. The rose-beige crystals form are filtered off through sintered glass and dried in an oven in vacuo at 35–40° C. The pale yellow salt obtained (85.6% yield) melts at 200° C. (indistinct, Maquenne block).

Analysis. — Calculated: C=52.5%; H=4.3%; N=3.5%; O=38.8%. Found: C=53.76%; H=4.69%; N=3.84% (Dumas); O=37.50%.

The water content of 7% corresponds to 2.9 molecules of water of crystallisation.

Example III

Chlortetracycline (47.9 g., 0.1 mole) is added with agitation to a solution of 4-methyl-aesculetin-monoethanoic acid (25.02 g., 0.1 mole) in dimethylformamide (100 ml.). The dark yellow liquid obtained is filtered, and 250 ml. of demineralised water are added thereto. The desired salt is precipitated as an amorphous, uncrystallisable, yellow-beige mass.

The $LD_{50}$ of the salt of Example I, calculated by the method of Karber and Behrens in the mouse, is 650 mg./kg. by the intraperitoneal route (by injection of a suspension of the compound in an isotonic solution of sodium chloride) and 650±20 mg./kg. by the intravenous route (by injection of the compound dissolved in a 20% aqueous dimethylformamide solution). When administered to the mouse as an aqueous suspension by oesophagal probe, the compound caused no deaths in a dosage of 10 g./kg.

This new salt exhibits vitamin P activity, shown by:

(1) The time taken for petechiae to appear on the back of guinea pigs subjected to a constant depression, this time changing from 56 seconds to 160 seconds after peritoneal injection of 100 mg./kg. of the compound, while it increases only from 61 to 74 seconds when a similar injection of tetracycline hydrochloride is made;

(2) The time taken for a spot of trypan blue to appear on the abdomen of the rabbit after intravenous injection of this dyestuff (1 ml./kg. of a 1% aqueous solution), followed 30 minutes later, by intraperitoneal injection of the new compound (38.7 mg./kg., or 77.5 mg./kg.).

In addition, the new salt exhibits an anti-inflammatory effect, as shown by experiments on the Wistar rat, in which experimental oedema had been produced. While little effect is shown in the kaolin oedema test (intraperitoneal injection of 100 mg./kg. of the salt produces substantially the same effect as 200 mg./kg. of delta-hydrocortisone) the activity is distinctly higher in oedema produced by formaldehyde. At the end of the test, the mean weight of the paws amputated at the 24th hour was in the ratio of 35:22 for the new salt compared with delta-hydrocortisone.

The new salt also exhibits bacteriostatic properties, established by the technique of serial dilutions in liquid media and by the technique of dilutions in solid media, and also bactericidal properties, as has been shown by research carried out in liquid media, by measuring the bacteriostasis 5 minutes and 24 hours after bringing the salt into contact with the inoculum (0.1 ml. of a 10⁻³ dilution of a broth culture, generally 24 hours old, but 72 hours old in the case of brucellae). The activity of the new salt on brucellae is greater than that of tetracycline and it is also slightly superior on staphylococcus and colibacillus in liquid media.

The new salts may be employed more particularly for the treatment of brucelloses, as also, having regard to the analogy of its properties to those of the tetracyclines and their derivatives, for example for the treatment of: acute pneumopathies, chronic infections of the respiratory ducts; infectious diseases in the adult and the infant; septicaemia, endocarditis, meningitis, acute and chronic genitourinary infections, infections of the biliary ducts, otorhinolaryngological infections, and surgical infections.

They may be presented in association with an excipient for oral, endorectal or parenteral administration, or again for cutaneous application. In the case of oral administration, it is desirable to protect the new salts against attack by the gastric juice. For this purpose, they may be presented under an enteric coating, for example in the form of capsules or gelatin-coated pills or again in the form of sugar-coated tablets. An example of the latter is as follows:

Example IV

| Nucleus (0.545 g.) | G. |
|---|---|
| Salt of Example I | 0.420 |
| Lactose | 0.100 |
| Starch | 0.010 |
| Gum arabic powder | 0.010 |
| Magnesium stearate | 0.005 |
| Cellulose acetophthalate (or ethyl acetate, isopropyl alcohol or ethyl phthalate) | 0.040 |
| Coating (0.455 g.) | |
| Talc | 0.025 |
| Gum arabic powder | Trace |
| Talc | 0.07 |
| Crystallised sugar | 0.32 |
| Orange yellow S | Trace |
| Carnauba wax | Trace |

I claim:
1. The salt of formula:

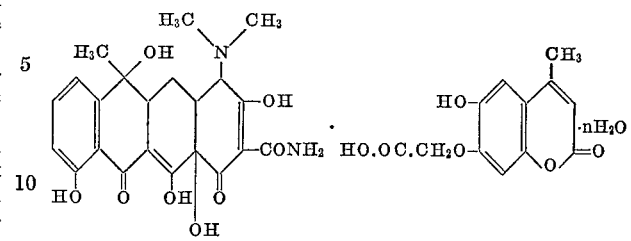

where $n$ is 2 or 3.

2. A salt of 4-methyl-aesculetin-monoethanoic acid with a compound selected from the group consisting of tetracycline, oxytetracycline and chlorotetracycline, the ratio of said acid to said compound being 1:1.

3. The salt according to claim 2 wherein the compound is tetracycline.

4. The salt according to claim 2 wherein the compound is oxytetracycline.

5. The salt according to claim 2 wherein the compound is chlorotetracycline.

References Cited

UNITED STATES PATENTS 3,375,165   3/1968   Hagemann et al. ____ 260—559

ALEX MAZEL, Primary Examiner

ANNE MARIE T. TIGHE, Assistant Examiner

U.S. Cl. X.R.

260—559; 424—227